United States Patent
Savage et al.

(10) Patent No.: US 7,447,158 B2
(45) Date of Patent: Nov. 4, 2008

(54) SYSTEM AND METHOD FOR TESTING SIGNALS WITHIN DIGITAL-NETWORK PACKETS

(75) Inventors: Peter Savage, Mont Vernon, NH (US); John D. Doyle, Hollis, NH (US); Monica Chandnani, Stoneham, MA (US); David Hsing-Wang Wong, Boston, MA (US); Tibor Ivanyi, Pelham, NH (US); Eduardo Joo, Boston, MA (US); Jason Neri, Acton, MA (US)

(73) Assignee: Empirix Inc., Bedford, MA (US)

( * ) Notice: Subject to any disclaimer, the term of this patent is extended or adjusted under 35 U.S.C. 154(b) by 840 days.

(21) Appl. No.: 10/766,293

(22) Filed: Jan. 28, 2004

(65) Prior Publication Data

US 2005/0163052 A1 Jul. 28, 2005

(51) Int. Cl.
*H04L 12/26* (2006.01)
(52) U.S. Cl. ................ 370/242; 370/252
(58) Field of Classification Search ........... 370/216, 370/241, 242, 252, 255, 332, 395.6, 401
See application file for complete search history.

(56) References Cited

U.S. PATENT DOCUMENTS

| 5,872,775 | A | * | 2/1999 | Saints et al. | ........ 370/342 |
|---|---|---|---|---|---|
| 5,933,475 | A | | 8/1999 | Coleman | |
| 6,046,780 | A | * | 4/2000 | Tani | ........ 348/722 |
| 6,188,728 | B1 | * | 2/2001 | Hurst | ........ 375/240.16 |
| 6,434,168 | B1 | * | 8/2002 | Kari | ........ 370/521 |
| 6,480,467 | B1 | * | 11/2002 | Hernandez-Valencia | ........ 370/230 |
| 6,944,123 | B1 | * | 9/2005 | Moon | ........ 370/216 |
| 2003/0007459 | A1 | * | 1/2003 | Yi et al. | ........ 370/252 |
| 2003/0063566 | A1 | * | 4/2003 | Abramovitch et al. | ........ 370/241 |
| 2003/0072229 | A1 | * | 4/2003 | Hasegawa et al. | ........ 369/47.3 |
| 2004/0199388 | A1 | * | 10/2004 | Armbruster et al. | ........ 704/251 |
| 2005/0047423 | A1 | * | 3/2005 | Kaul et al. | ........ 370/401 |

* cited by examiner

*Primary Examiner*—Ricky Q. Ngo
*Assistant Examiner*—Kan Yuen
(74) *Attorney, Agent, or Firm*—Chapin IP Law, LLC; David W. Rouille, Esq.

(57) ABSTRACT

A system and method for testing signals in digital-network packets includes generation of reference clips and associated reference key values and comparison of the reference key values with current key values associated with incoming current-digital-network packets under test In this way the incoming current-digital-network packets can be tested for either a correct audio and/or video signal or a signal with sufficiently high signal integrity to allow it to be understood by a user at a destination point.

36 Claims, 7 Drawing Sheets

SYSTEM AND METHOD FOR TESTING SIGNALS WITHIN DIGITAL-NETWORK PACKETS

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to testing of electronic signals contained within digital-network packets, and more particularly to testing of devices and systems that provide outputs having the digital-network packets or that can be transformed into the digital-network packets.

BACKGROUND OF THE INVENTION

As is known, the public switched telephone network (PSTN) carries voice and/or video between origination points and destination points, for example, voice between origination and destination telephones. The PSTN is also adapted to carry dual-tone multi-frequency (DTMF) communications, generated, for example, by keypad pushes on a telephone or by a computer modem. The PSTN has historically included only analog telephone signals, either singly or as analog time-division multiplexed (TDM) telephone signals. The TDM analog signals can be multiplexed in a variety of ways, for example, as TDM analog signals corresponding to twenty-four analog telephone calls on a T1 telephone line.

The PSTN is a connection system, meaning that connections are formed and reserved between the origination and destination points covering an entire "session." Even during periods of silence, the origination and destination points remain connected, resulting in relatively inefficient use of telephone wires and equipment.

Digital networks, for example the Internet, are connectionless systems, meaning that a connection is not established or reserved between an origination and a destination point at the time of the communication session. Instead, digital-network packets, which are sent from an origination point to a destination point, each travel to the destination point along a path determined by routers along the path. A path along which one digital-network packet is directed can be different than the path along which another digital-network packet is directed, even in the same communication. In this way, physical connections within a digital network are not reserved by either origination or destination points, but instead can be used by all origination and destination points. During idle periods between any origination point and corresponding destination point, the physical connections in the network are used by other origination and destination points, resulting in a more efficient use of physical equipment.

Noting this advantage, telephone companies have introduced digital networks within portions of the PSTN. As is known, some types of 'gateways' can translate from analog telephone signals or analog TDM telephone signals to digital-network packets and/or from digital-network packets to analog telephone signals or analog TDM telephone signals. Therefore, a telephone company can use a digital network within portions of the PSTN to improve equipment utilization. However, most conventional telephone equipment at the customer premises, i.e., origination and destination points, is adapted to send and receive only analog telephone signals.

Some forms of Customer Premises Equipment (CPE) are adapted to directly send and receive digital-network packets. For example, Internet telephones are able to communicate with Voice over Internet Protocol (VoIP) using a digital network. Some organizations thus distribute telephone calls with VoIP over a digital network within the organization, and convert the VoIP signals to analog telephone signals with a gateway when coupling the telephone calls to the PSTN.

A variety of telephone company equipment and CPE have one or more digital-network packet outputs for IP communications. Examples of such CPE include, but are not limited to, conference bridges, Internet telephones, and private branch exchange (PBX) systems.

It should be recognized that voice, DTMF, other audio signals, or video signals sent as digital-network packets need not be perfectly represented, i.e., need not have perfect data integrity, as is otherwise necessary with digital data. The voice, DTMF, other audio, or video signals, however, need to have a reasonable fidelity in order to be intelligible at the destination point.

As is known, digital-network packets progressing along paths as described above, can be lost or damaged. For example, a digital-network packet may be sent to a damaged router. Digital-network packets can also be re-transmitted, for example, by a router. Upon re-transmitting, the digital-network packet can be altered or damaged.

Therefore, it would be desirable to test audio and/or video signals within digital-network packets and equipment, which transports the digital-network packets, in the context of voice, DTMF, other audio, or video communications, which do not necessarily require perfect data integrity.

In order to test voice communications and/or voice communication equipment, which supports the IP protocol, conventional test systems acquire test voice clips, or, more generally, test audio clips. The test systems can acquire the test audio clips and compare them to expected audio clips. To this end the conventional test system acquires digital-network packets associated with a test audio clip, disassembles the digital-network packets to obtain real time protocol (RTP) payload portions of the digital-network packets having a test audio portion of the test audio clip, and re-assembles the RTP payloads to re-generate the test audio clip. In order to compare the test audio clip to an expected audio clip, the conventional test system converts the resulting re-generated test audio clip to the frequency domain with a Fourier transformation, and spectrally compares the test audio clip with the expected audio clip.

It will be understood by one of ordinary skill in the art that the disassembling and re-assembling of network packets as described above, as well as frequency domain processing, tends to require complex electronic circuits and software and tends to slow the testing throughput of digital-network packets.

SUMMARY OF THE INVENTION

The present invention provides a system and method for testing audio and/or video signals within digital-network packets, wherein the audio and/or video signals are represented within the real-time protocol (RTP) payloads of the digital-network packets. While certain applications are described herein, for example a voice signal corresponding to a telephone call, this invention is not limited to any particular application.

In accordance with the present invention, a method for testing signal characteristics of digital-network packets includes receiving one or more reference-digital-network packets corresponding to a predetermined digital media clip. One or more reference-real-time protocol payloads are extracted from the one or more reference-digital-network packets as a reference clip, which is then processed with a reference clip algorithm to provide one or more reference key values. One or more current-digital-network packets are also received and one or more current RTP payloads are extracted from the one or more current-digital-network packets. The current payloads are then processed with a current clip algorithm to generate one or more current key values. The current key values are compared with the reference key values in order to test the current-digital-network packets. The reference clip algorithm and the current clip algorithm can be the same or different. Different algorithms or the same algorithms can be used for different CODEC formats associated with the RTP payload portions of the reference and current digital-network packets.

In accordance with another aspect of the present invention, a computer program medium provides instructions in accordance with the above method.

In accordance with yet another aspect of the present invention, a method of testing digital-network packets includes receiving one or more digital-network packets and examining digital characteristics of the one or more digital-network packets with at least one silence algorithm to determine if the digital-network packets contain one or more periods of silence. Different silence algorithms can be used for different CODEC formats that can be associated with the RTP payload portions of the digital-network packets.

In accordance with another aspect of the present invention, a computer program medium provides instructions in accordance with the above method.

In accordance with a still further aspect of the present invention, a processor to test digital-network packets includes a digital-network-packet receiver to receive one or more reference-digital-network packets corresponding to a predetermined clip and to receive one or more current-digital-network packets for test. The processor also includes a payload extractor to extract, as a reference clip, one or more reference payloads from the one or more reference-network-packets and to extract one or more current payloads, as a current clip, from the one or more current-digital-network packets. A key generator having one or more reference clip algorithms is used to form one or more reference key values associated with the one or more reference payloads and a current algorithm is used to form one or more current key values associated with the one or more current payloads. A reference-key-and-reference-clip database is coupled to the payload extractor to store at least one of the reference clip and the one or more reference key values. A comparison processor is coupled to the key generator and to the reference-key-and-reference-clip database, to compare the one or more reference key values with the one or more current key values.

With the particular arrangements described above, a method and a system for testing digital-network packets having an embedded audio and/or video signal provides relatively simple processing having a high throughput rate.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the method and system of the present invention, some introductory concepts and terminology are explained. As used herein, the term "network" is used to describe any computer or telephone interconnection that carries voice (audio), video, or data. Networks include but are not limited to a public switched telephone network (PSTN), a public exchange (PBX) telephone network, the Internet including the world wide web (WWW), and a local area network (LAN), for example a LAN having an Ethernet structure.

As used herein, a "digital network" refers to a subset of all networks, and describes any interconnection that carries voice (audio), video, or data as connection-less digital-network packets, for example Internet protocol (IP) packets. Digital networks include but are not limited to portions of the public switched telephone network (PSTN), a digital public exchange (PBX) telephone network, the Internet including the world wide web (WWW), and a local area network (LAN), for example a LAN having an Ethernet structure.

As used herein, a "communication" refers to a transport of audio and/or video information from an origination point to a destination point.

As is known, a telephone call includes a signaling portion and a real-time media portion. The signaling portion is used to connect the telephone call, for example, to ring a telephone, and the real-time portion is used to convey a communication, for example, an audio communication. The real-time portion is typically referred to as media. The media in a voice communication includes only voice signals or periods of silence. The real-time portion can be associated with real-time protocol (RTP) payloads, which are described in FIG. 2 below to be portions of digital-network packets.

As used herein, a "telephone call" refers to an audio communication having the signaling portion and the real-time portion, which is carried on any type of network, for example the PSTN network. As used herein, a "telephone call network" refers to any network capable of transporting a signaling portion and a real-time portion associated with a telephone call, wherein the real-time portion includes a voice communication, and wherein the telephone call networks include but are not limited to, the PSTN, the Internet, and an intranet.

It will be recognized that the PSTN is not the only type of network that can carry telephone calls. For example, Voice over Internet Protocol (VoIP) is a protocol that allows voice communications to be carried on a network capable of Internet protocol (IP) communications, for example, the Internet. Data within VoIP can have signaling and real-time portions having functions similar to those described above. For example, VoIP includes signals capable of ringing an Internet telephone or otherwise alerting an Internet-connected personal computer (PC), and also signals adapted to indicate that the Internet telephone or the PC has been answered. VoIP can also include real-time voice signals.

Figure 1:
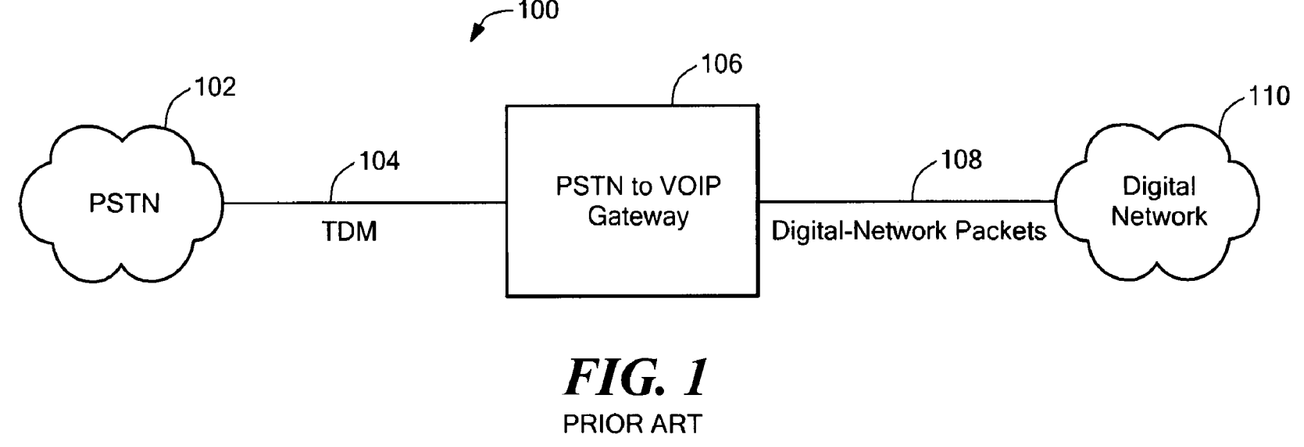
FIG. 1 is a block diagram of a prior art coupling between the public switched telephone network and a digital network with a PSTN to Voice over Internet Protocol (VoIP) gateway.

Referring now to FIG. 1, a prior art network 100 includes a first telephone call network 102, for example the PSTN, and a second telephone call network 110, for example the Internet, coupled with a gateway 106. The first telephone call network 102 carries TDM analog signals 104 and the second telephone call network is a digital network that carries digital-network packets 108. The gateway 106 provides a translation between the TDM analog signals 104 and digital-network packets 108, in one direction or in both directions.

Though the gateway 106 is shown to provide and/or receive digital-network packets 108 that can be associated with TDM analog telephone signals 104, it will be recognized that other forms of equipment can provide digital-network packets that can be associated with single analog telephone signals or with TDM analog telephone signals. For example, an Internet telephone can directly provide digital-network packets that are associated with single analog telephone signals. The other types of equipment can also provide RTP payloads having a CODEC format, for example, any of the CODEC formats described below.

Other forms of telephone equipment that generally provide single analog telephone signals or TDM analog telephone signals can be converted with a gateway, such as the gateway 104, to provide digital-network packets. For example, an interactive voice response system (IVR), often used as part of a contact or calling center, is known to provide a simulated voice response to a caller. The simulated voice response, if presented to a gateway such as the gateway 104, can be converted to digital-network packets, either at the contact center or remotely from the contact center.

Figure 2:
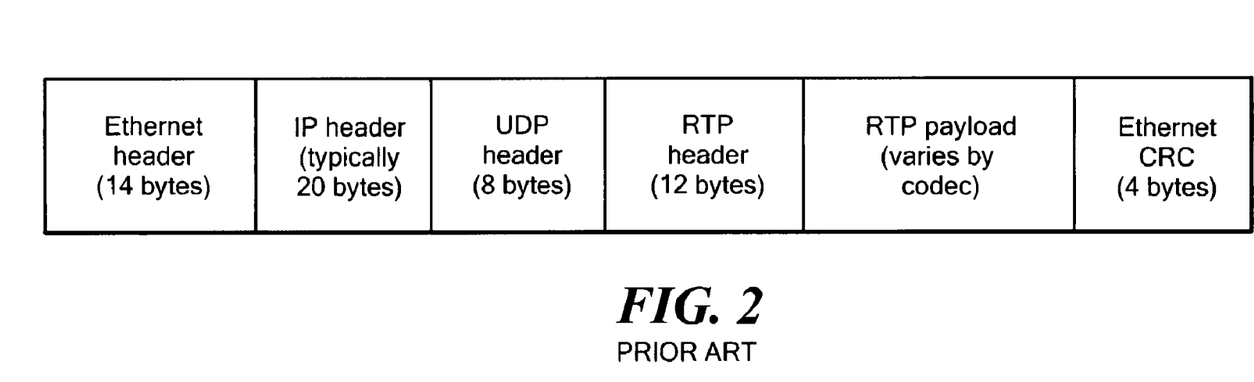
FIG. 2 is a block diagram of an exemplary prior art digital-network packet as transported on a network.

Referring now to FIG. 2, a prior art digital-network packet, transported on an Ethernet network, includes an Ethernet header, an Internet protocol (IP) header, a user datagram protocol (UDP) header, a real-time protocol (RTP) header, an RTP payload, and an Ethernet cyclic redundancy check (CRC). It will be understood that within the digital-network packet, only the RTP header and payload bytes correspond to an audio and/or video communication, and other portions of the digital-network packet are used for routing the digital-network packet from a source to a destination and for error checking the digital-network packet. It should be understood that the RTP header and the RTP payload represent but one type of "media transport protocol" within which signals and data can be transported.

It should be appreciated that the RTP payloads of the digital-network packets can be encoded in one of a variety of CODEC formats, including, but not limited to a G.711 format, a G.723 format, a G.729 format, an AMR format, a global system for mobile communications (GSM) format, a G.726 format, a G.722 format, a G.728 format, and video CODEC formats MPEG2 and MPEG4. It should also be appreciated that each CODEC format can be associated with a different size of RTP payload. For example, it is known that the G.711 format includes digital-network packets having an RTP payload size of 160 bytes, the G.723 format includes digital-network packets having an RTP payload size of 24 bytes, and the G.729 format includes digital-network packets having an RTP payload size of 20 bytes.

It should also be appreciated that an audio or video communication can be distributed among a large number of digital-network packets. Conventionally, only when the large number of digital-network packets are disassembled to provide the RTP payloads, and only when the RTP payloads are re-assembled contiguously, can the original audio or video communication be resolved and understood.

While a particular format of digital-network packet is shown, digital-network packets having other formats are also possible, each form having an RTP payload.

Figure 3:
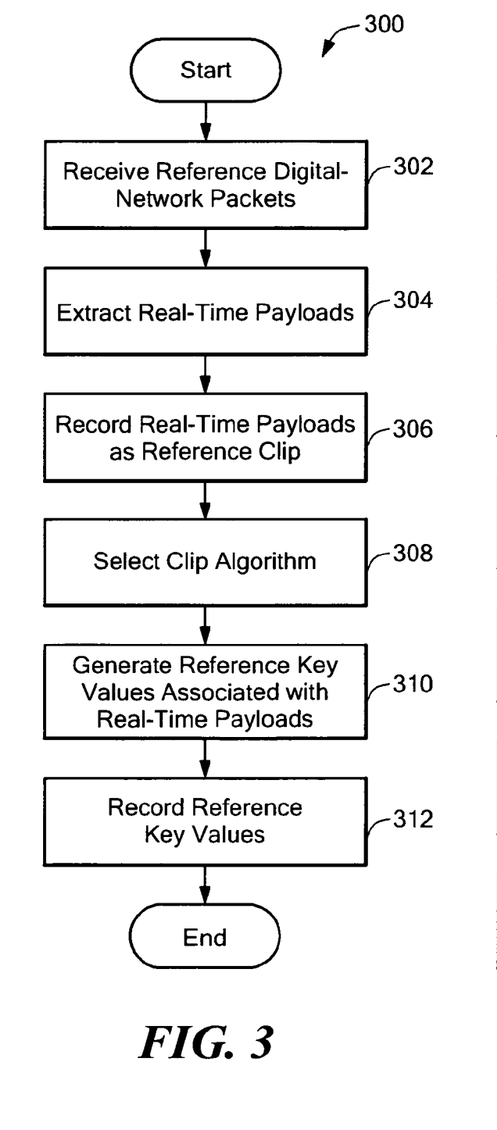
FIG. 3 is a flow chart showing a portion of an exemplary method of generating reference key values for a reference clip.

Referring now to FIG. 3, a method 300 of generating reference key values begins at step 302, at which reference digital-network packets are received. The reference digital-network packets correspond to a known audio and/or video signal. The digital-network packets received at step 302 can correspond to one reference audio and/or video signal or to a plurality of reference audio and/or video signals. One or more reference digital-network packets can be received.

Digital-network packets corresponding to each one of the audio and/or video signals are processed at step 304, where real-time protocol (RTP) payloads of the digital-network packets corresponding to each one of the audio and/or video signals are extracted as corresponding groups from the digital-network packets. At step 306 each group of digital-network packets are recorded as corresponding "reference clips." Therefore, each reference clip corresponds to a known reference audio and/or video signal, and together the groups of RTP payloads form a plurality of reference clips.

Reference clips can be accumulated in the above way corresponding not only to a variety of audio and/or video signals, but also corresponding to a variety of CODEC formats. For example, taking as an example one group of RTP payloads corresponding to one particular audio and/or video signal and corresponding to a reference clip, the reference clip can be recorded having a variety of CODEC formats, including, but not limited to the G.711 format, the G.723 format, the G.729 format, the AMR format, the global system for mobile communications (GSM) format, the G.726 format, the G.722 format, the G.728 format, and the video CODEC formats MPEG2 and MPEG4.

A reference clip comprised of RTP payloads of digital-network packets can be associated with a variety of signals, including but not limited to, a voice audio signal, a non-voice audio signal, a dual-tone multi-frequency (DTMF) telephone digit, a single tone, and a video signal.

At step 308, a reference clip algorithm is selected. At step 310, "reference keys" associated with each of the one or more reference clips are generated by one or more reference clip algorithms, and at step 312, the reference keys are recorded.

The relationship between reference clips, exemplary reference clip contents, exemplary CODEC formats, algorithms, and exemplary reference key values is represented below in Table 1. As shown, reference clips associated with the same CODEC format, for example G.711, are also associated with the same reference clip algorithm is used to provide the reference key values. Each reference clip can be associated with a number of reference key values, the number of which depends not only upon the length of the content of the reference clip, but also on the associated CODEC format.

TABLE 1

| Ref. Clip | Content | CODEC | Ref. Clip Algorithm | Ref. Key Values |
|---|---|---|---|---|
| Clip A | audio | G.711 | a | a(A, 1), a(A, 2), ... , a(A, u) |
| Clip A | audio | G.723 | b | b(A, 1), b(A, 2), ... , b(A, v) |
| Clip A | audio | G.729 | c | c(A, 1), c(A, 2), ... , c(A, w) |
| ... | | ... | ... | |
| Clip N | DTMF | G.711 | a | a(N, 1), a(N, 2), ... , a(N, x) |
| Clip N | DTMF | G.723 | b | b(N, 1), b(N, 2), ... , b(N, y) |
| Clip N | DTMF | G.729 | c | c(N, 1), c(N, 2), ... , c(N, z) |

In Table 1, a different reference clip algorithm is shown in association with each different CODEC format. For example, CODEC format G.711 is associated with reference clip algorithm 'a,' regardless of the content of the reference clip. However, it is also possible that the same algorithm can be associated with two or more of the CODEC formats.

A variety of algorithms can be used to generate the reference key values. In general, the algorithms and the associated reference key values are selected so that the reference key values can be compared against similarly generated key values ("current key values") associated with incoming ("current") digital-network packets under test. In order to make such a comparison easier, and therefore, to save processing time, it is desirable that the reference key values be compared with the current key values to find exact matches. Therefore, the algorithms used to generate the reference key values and the current key values should tolerate small errors associated with the digital-network packets, for example digital noise. In other words, using the first reference clip, A, in Table 1 as an example, it is desirable that the reference key values a(A,1), a(A,2), ... , a(A,u), not be influenced by small errors in the reference clip A, which is a compilation of RTP payloads of one or more digital-network packets. As described above, small errors in audio and/or video signals transported as digital-network packets are not generally important, since the original audio and/or video signal can be discerned in the presence of the small errors.

Using one of a plurality of RTP payloads of one of a plurality of reference clips coded in G.711 format as representative of all RTP payloads in all reference clips and all CODEC formats, an exemplary algorithm that can be used to generate reference key values is indicated in Table 2. The G.711 CODEC format is known to provide one hundred sixty bytes per RTP payload associated with one digital-network packet. Table 2 shows eighty keys associated with one RTP payload. In the exemplary algorithm shown in Table 2, each key value consists of eight bytes without further processing, and the eight bytes of each of the eighty key values are offset by two bytes from the next key value.

TABLE 2

| Key | Starting Byte of Key Values | Ending Byte of Key Values |
|---|---|---|
| 1 | 1 | 8 |
| 2 | 3 | 10 |
| 3 | 5 | 12 |
| ... | | ... |
| 80 | 153 | 160 |

As described above, the G.723 CODEC format has RTP payloads with 24 bytes and the G.729 format has RTP payloads with 20 bytes. CODEC specific algorithms that utilize one or more reference key values per payload can be developed for G.723 and G.729 CODEC formats.

Also, the RTP payloads can be provided without a CODEC format and an algorithm can be associated with un-coded RTP payloads to generate key values. While an algorithm is shown in Table 2 utilizing bytes of the RTP payloads without further processing upon the bytes, other algorithms can also be used which provide processing upon the bytes of the RTP payload.

While an algorithm is shown in Table 2 that generates eighty key values for each one-hundred sixty byte G.711 RTP payload, other embodiments can provide algorithms that generate more than eighty, for example one-hundred sixty, or fewer than eighty keys. Of the key values generated by the algorithm, any number of the key values can be used to compare against any number of key values similarly generated for the current clip, as will be further described in conjunction with FIGS. 4A and 4B.

It should be understood that, while FIG. 3 has been described to generate one reference clip and associated reference key values associated with one or more RTP payloads from the reference clip, a variety of reference digital-network packets can be similarly processed to provide a variety of reference clips and a variety of associated reference key values.

Figure 4A:
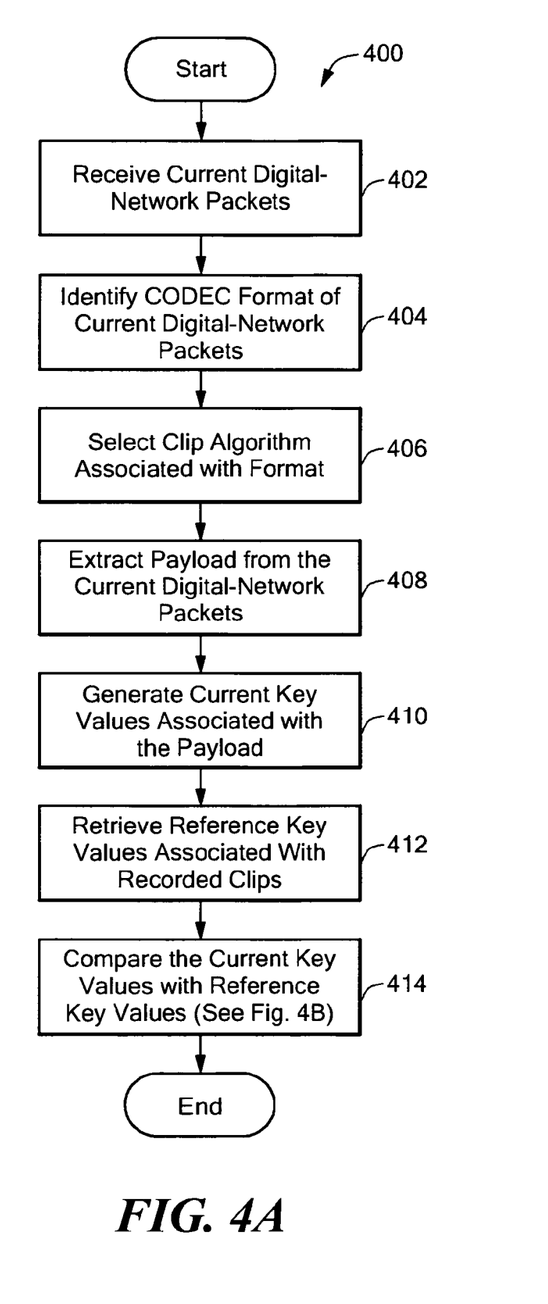
FIG. 4A is a flow chart showing an exemplary method of generating and comparing key values.

Referring now to FIG. 4A, an exemplary test process 400 used to test incoming "current" digital-network packets begins at step 402, where current digital-network packets are received.

At step 404 a CODEC format associated with RTP payloads of the digital-network packets is identified. The identification of the CODEC format can either be performed by automatic detection based, for example, on the data contained in the RTP header (FIG. 2), or alternatively, the CODEC format can be already known. The current digital-network packets can be associated, like the reference digital-network packets, with a variety of CODEC formats, including, but not limited to the G.711 format, the G.723 format, the G.729 format, the AMR format, the global system for mobile communications (GSM) format, the G.726 format, the G.722 format, the G.728 format, and the video CODEC formats MPEG2 and MPEG4. Also, the current digital-network packets, like the reference digital-network packets, can have no coding.

At step 406, a current clip algorithm is selected in accordance with the identified CODEC format. The current clip algorithm corresponds to those reference clip algorithms shown above in Table 2 that were used to generate the reference key values. As described above, the current clip algorithm can be the same current clip algorithm irrespective of the CODEC format, or it can be different for some or all of the various CODEC formats.

At step 408, RTP payloads are extracted from the current digital-network packets, to generate a "current clip" in the same way that extraction occurred for the reference digital-network packets in step 304 of FIG. 3

At step 410 current key values are generated in much the same way as shown, for example, in Table 2 for the reference key values and as described at step 310 of FIG. 3. However, for the current clip, either all of the RTP payloads associated with a current clip are processed to provide the current key values, or only some of the RTP payloads are processed to provide one or more current key values.

In general, it is only necessary to compare a subset of current key values of a current clip with the reference key values of a corresponding reference clip in order to establish a match. In one exemplary embodiment, two successive current key values are generated at step 310, for example a first current key value corresponding to bytes 1-8 of the first RTP payload of the current clip and a second current key value corresponding to bytes 2-9 of the first RTP payload. In another exemplary embodiment, only the first current key value is generated.

At step 412, the reference key values generated at step 312 of FIG. 3 are retrieved.

At step 414, the current key values generated at step 410 are compared against the reference key values retrieved at step 412. The comparison is further described in conjunction with FIG. 4B below.

The current key values can be compared with the reference key value to establish a match for a variety of reasons. For example, a match can indicate that an interactive voice response (IVR) system associated with a contact or calling center has provided the correct simulated voice response in response to a request. Alternatively, a match can be used to test a gateway, as shown in FIG. 1, to merely indicate that a telephone signal has been transformed from analog format to digital-network packets with sufficient signal integrity to allow a user to understand the transformed signal when received at a destination point. In essence the match can be used for a variety of purposes to test a variety of equipment.

Figure 4B:
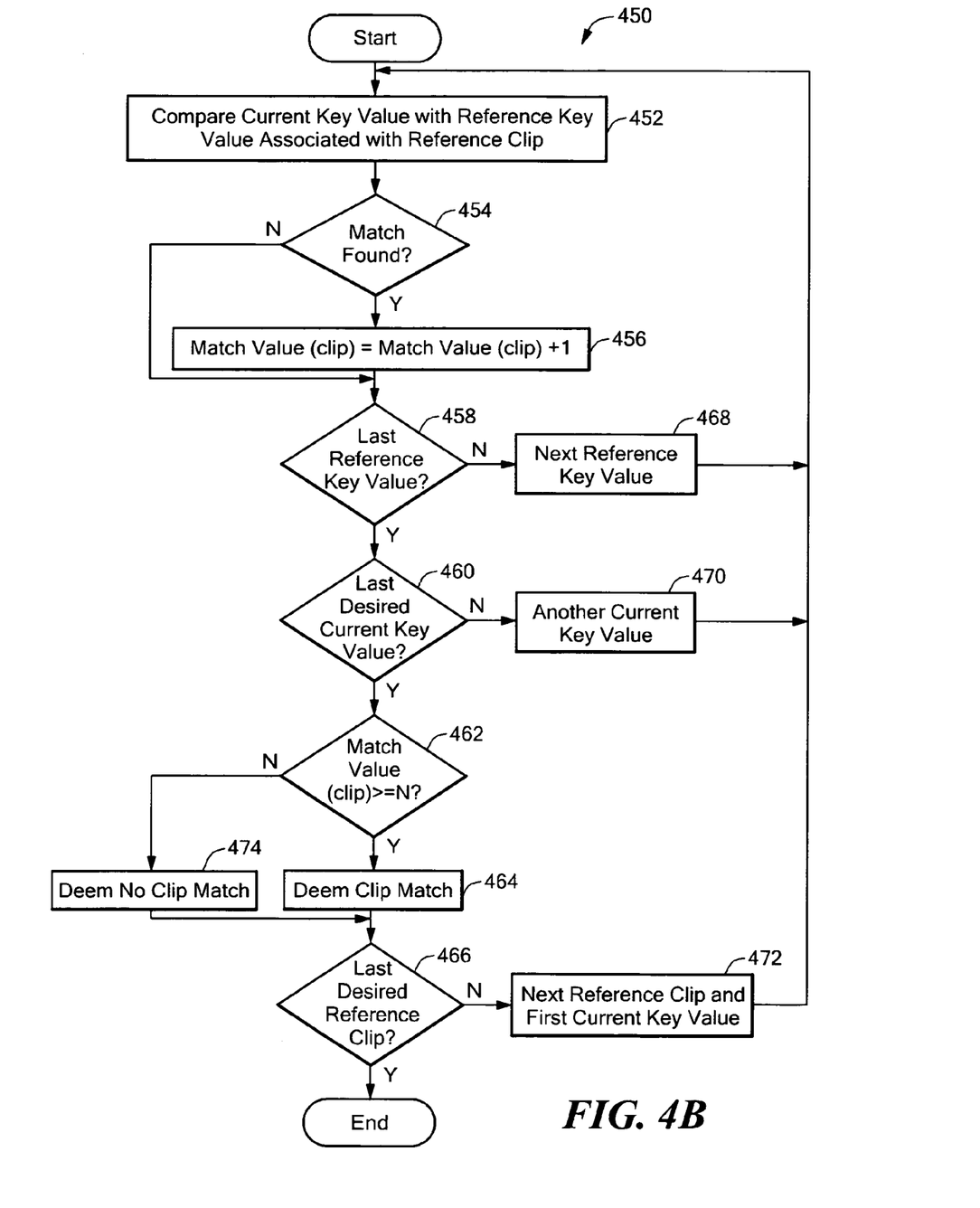
FIG. 4B is a flow chart showing a portion of the exemplary method of FIG. 4A, showing an exemplary method of comparing a digital-network packet to a reference clip.

Referring now to FIG. 4B, an exemplary process 450 for matching current key values with reference key values begins at step 452, where a first current key value is compared with a first reference key value associated with a first reference clip. The first current key value can be, for example, the first eight bytes of the first RTP payload of the first of the current digital-network packets. However, the first current key value can correspond to other bytes of the current RTP payload, processed or unprocessed.

At step 454, if a match is found, the process proceeds to step 456, where a "match value" is incremented by one. If, at step 454, no match is found, the process jumps to step 458 and the match value is not incremented.

At step 458, if the reference key value used in the comparison is not the last reference key value of the reference clip, then the process continues to step 468 where the next reference key value is selected and the process returns to step 452.

At step 458, if the reference key value used in the comparison is the last reference key value of the reference clip, then the process continues to step 460. At step 460, if the current key value being processed is not the last current key value desired for comparison, then the process continues to step 470, where another current key value is selected. Then, the process continues at step 452. In this way, the match value generated at step 456 will be representative of the number of matches between the desired current key values and any of the reference key values associated with a reference clip. As described above in conjunction with FIG. 4A, in order to reduce processing time, it may be desirable to use only a few current key values in the comparison processing. In one exemplary embodiment, two successive current key values are used. In another exemplary embodiment, one current key value is used.

At step 460, if the current key value being processed is the last current key value desired for comparison, then the process continues to step 462, where the match value is compared with a threshold value, N. The threshold value can be any value. In one exemplary embodiment, the threshold value is four.

At step 462, if the match value is greater than or equal to the threshold value, N, then the current clip being processed is deemed to match the particular reference clip at step 464. Otherwise, the current clip is deemed not to match the particular reference clip at step 474.

The process then proceeds to step 466, where it is determined if the current clip being processed should be compared against any other reference clips, regardless of whether a match was deemed at step 464. If another comparison is desired, the process proceeds to step 472, where another reference clip and associated reference key values are selected and the first current key value is again used to return to step 452. In this way, another match value associated with the new reference clip can be generated for comparison with the threshold value at step 462. Therefore, the current clip can be compared against one or more reference clips, including all of the reference clips if desired. It is possible that the current clip will be deemed to match more than one reference clip.

The threshold value N, used at step 462 above can be the same or can be different for each of the CODEC formats described above. Also, the number of current key values used can be the same or different for each of the CODEC formats used. In one particular embodiment, two successive current key values are used for comparison for each CODEC format and the threshold values, N, is also the same for each CODEC format.

Figure 5A:
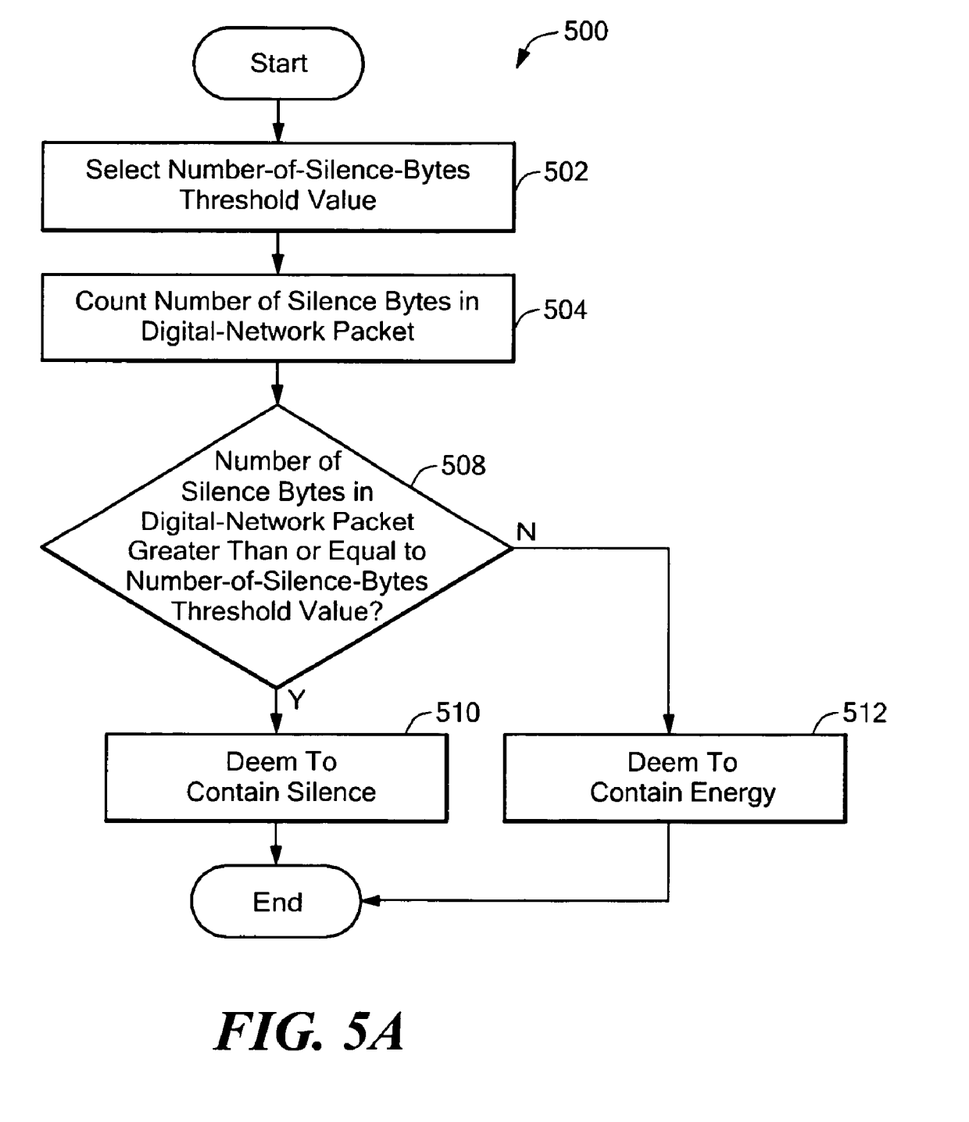
FIG. 5A is a flow chart showing an exemplary method of detecting a period of silence in a digital-network packet.

Referring now to FIG. 5A, a process 500 for detecting a period of silence in a single G.711 coded digital-network packet begins at step 502, where a number-of-silence-bytes threshold value is established. In one particular embodiment the number-of-silence-bytes threshold value is one hundred sixty for G.711.

At step 504, a number of silence bytes is counted within the RTP payload of the digital-network packet, which is known to contain one hundred sixty bytes. In one particular embodiment, an exemplary "silence byte" is identified as a byte having a binary value of x1111xxx where x can be either zero or one.

At step 508, the counted number of silence bytes is compared with the number-of-silence-bytes threshold value. If, at step 508, the counted number of silence bytes is greater than or equal to the number-of-silence-bytes threshold value, then at step 510, the digital-network packet is deemed to contain silence. If the counted number of silence bytes is less than the number-of-silence-bytes threshold value, then at step 512, the digital-network packet is deemed to contain energy, i.e., the opposite of silence.

It will be appreciated that with the process 500, detection of a digital-network packet containing a period of silence can be performed on each digital-network packet, in parallel with or separate from the processing identified in FIGS. 3, 4A, and 4B.

Figure 5B:
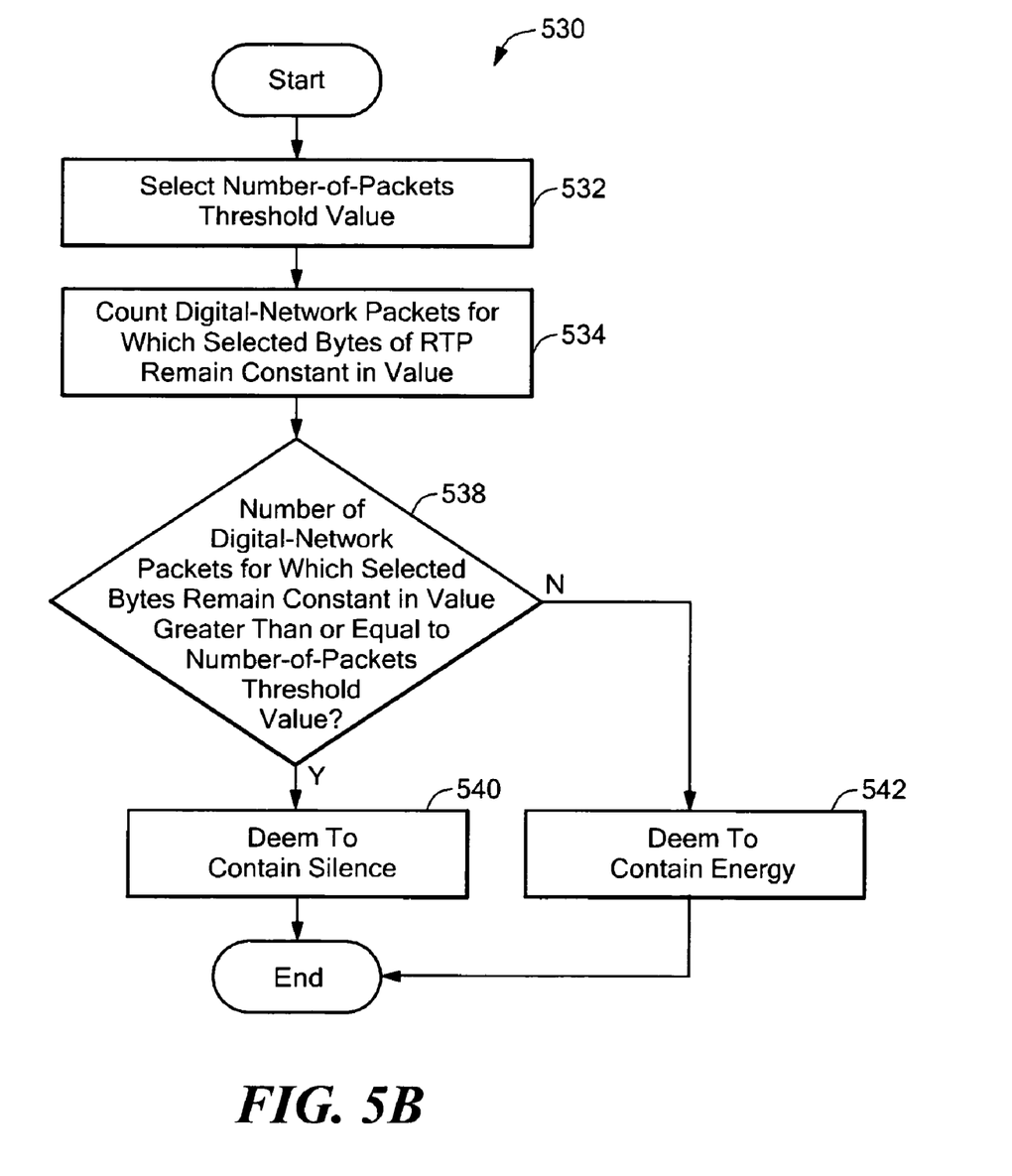
FIG. 5B is a flow chart showing another exemplary method of detecting a period of silence in a sequence of digital-network packets.

Referring now to FIG. 5B, a process 530 for detecting a period of silence in a group of G.729 coded digital-network packet begins at step 532, where a number-of-packets threshold value is established. In one particular embodiment the number-of-packets threshold value is two consecutive packets.

At step 534, digital-network packets known to each contain 20 bytes for G.729, are counted, for which portions of the RTP payload within the digital-network packet remain constant in value.

At step 538, the counted number of silence packets is compared with the number-of-packets threshold value. If, at step 538, the counted number of silence packets is greater than or equal to the number-of-packets threshold value, then at step 540, the digital-network packets are deemed to contain silence. If the counted number of silence packets is less than the number-of-packets threshold value, then at step 542, the digital-network packets are deemed to contain energy, i.e., the opposite of silence.

It will be appreciated that with the process 530, detection of silence digital-network packets can be performed within a group of digital-network packets, in parallel with or separate from the processing identified in FIGS. 3, 4A, and 4B.

Figure 5C:
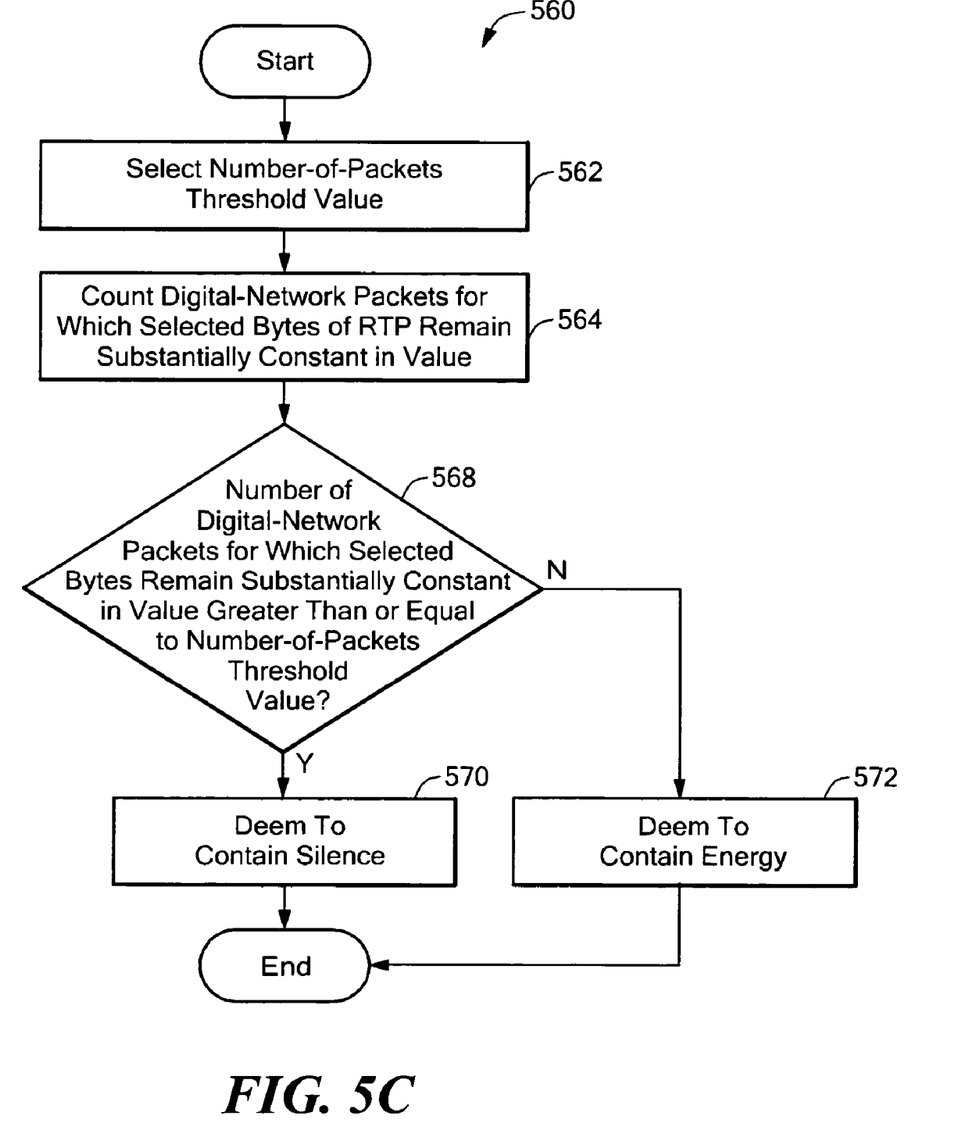
FIG. 5C is a flow chart showing yet another exemplary method of detecting a period of silence in a sequence of digital-network packets.

Referring now to FIG. 5C, a process 560 for detecting a period of silence in a group of G.723 coded digital-network packet begins at step 562, where a number-of-packets threshold value is established. In one particular embodiment the number-of-packets threshold value is three digital-network packets our of six digital-network packets.

At step 564, digital-network packets known to each contain 24 bytes for G.723, are counted, for which portions of the RTP payload within the digital-network packet remain substantially constant in value. A "silence packet" is identified as a packet having RTP payload bytes with values that are substantially equal across digital-network packets.

At step 568, the counted number of digital-network packets is compared with the number-of-packets threshold value. If, at step 568, the counted number of digital-network packets is greater than or equal to the number-of-packets threshold value, then, at step 570, the digital-network packets are deemed to contain silence. If the counted number of digital-network packets is less than the number-of-packets threshold value, then, at step 572, the digital-network packets are deemed to contain energy.

It will be appreciated that with the process 560, detection of silence digital-network packets can be performed within a group of digital-network packets, in parallel with or separate from the processing identified in FIGS. 3, 4A, and 4B.

Figure 6:
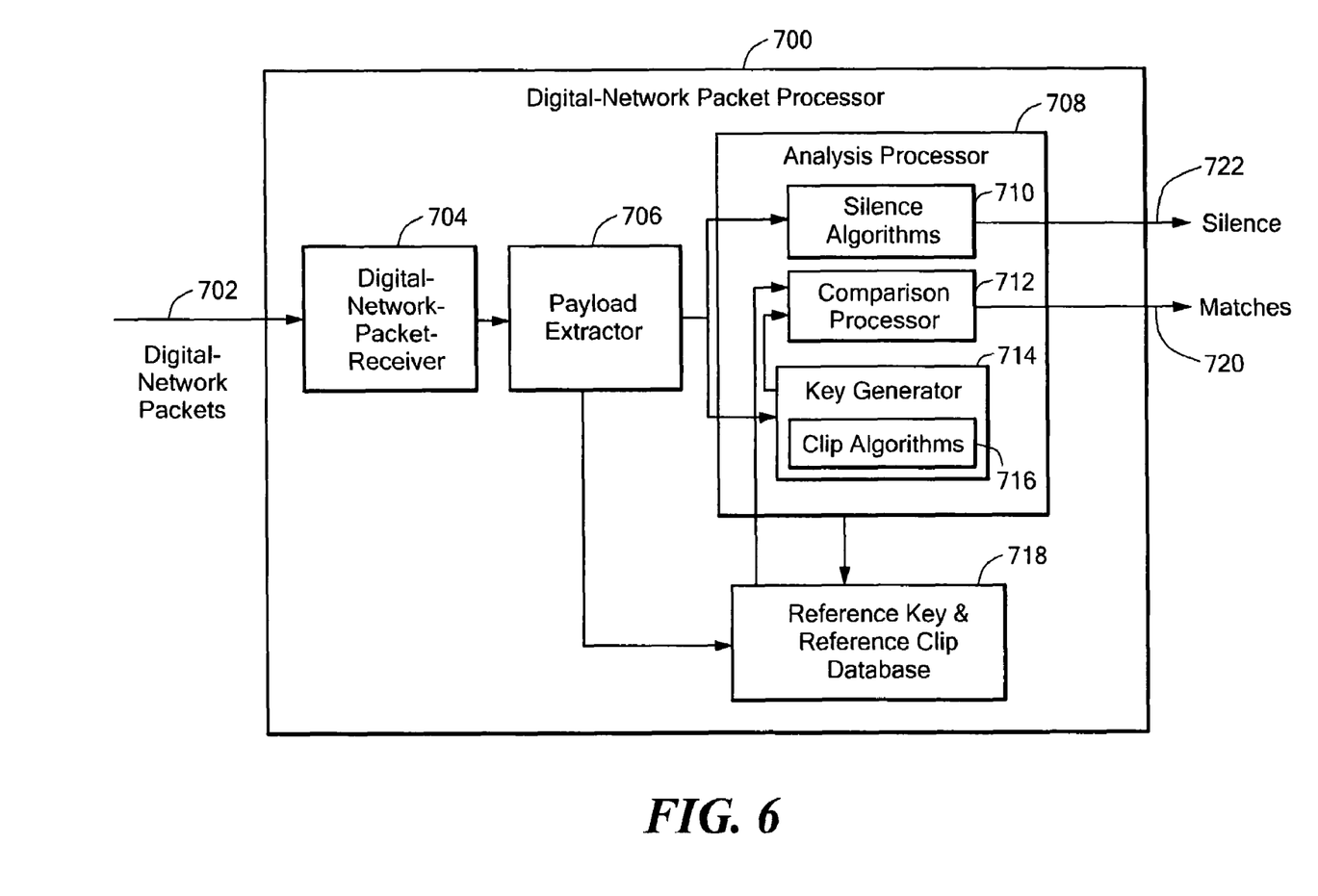
FIG. 6 a block diagram of a digital-network packet processor.

Referring now to FIG. 6, a digital-network packet processor 700 includes a digital-network packet receiver 704 adapted to receive digital-network packets 702. A payload extractor 706 extracts the RTP payloads of the digital-network packets as described at step 304 of FIG. 3 and step 408 of FIG. 4A.

The extracted RTP payloads correspond to one or more digital-network packets, each of which can have a payload size in accordance with a CODEC format. The extracted payloads can correspond to a reference clip, to a current clip, or to a period of silence, each described above. Reference clips can be provided to a reference-key-and-reference-clip database 718. The extracted payloads can also be provided to an analysis processor 708, and in particular to a key generator 714, having one or more clip algorithms 716, as described above in conjunction with FIG. 3, which are used to generate reference key values and current key values. Reference key values are provided to the reference-key-and-reference-clip database 718 for later retrieval.

The analysis processor 708 also includes a comparison processor 712 which can compare the retrieved reference key values with the current key values, as described above in conjunction with FIG. 4A, to provide an output 720 indicative of matches between current clips and reference clips, as described above in conjunction with FIG. 4B.

The analysis processor 708 can also include one or more silence algorithms 710, for example the silence algorithms described in conjunction with FIGS. 5A-5C, to provide an output 722 indicative of detection of silence digital-network packets or groups of silence digital-network packets.

While it has been described above that reference clips are provided to the reference-key-and-reference-clip database 718, in another embodiment no reference clips are recorded, since it is the reference key values associated with each reference clip that are used by the comparison processor 712 to compare with current key values.

Also, while the reference-key-and-reference-clip database 718 is shown to be included in the digital-network packet processor 700, in other embodiments, the reference-key-and-reference-clip database 718 is separate from, yet coupled to, the digital-network packet processor 700.

It should also be appreciated that the digital-network packet processor 700 can have a variety of forms, both as a single integrated circuit, as separate integrated circuits, as a single instrument, or as separate instruments partitioned in any way. Also, elements of the digital-network packet processor 700 can be hardware elements, while other elements can be software elements.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims. All publications and references cited herein are expressly incorporated herein by reference in their entirety.

What is claimed is:

1. A method of testing signal characteristics of a communication formed from digital-network packets having a transport protocol, comprising:

receiving one or more reference-digital-network packets corresponding to a predetermined clip, the one or more reference-digital-network packets having the transport protocol;

extracting one or more reference-real-time protocol payloads from the one or more reference-digital-network packets as a reference clip;

selecting a reference clip algorithm;

generating one or more reference key values associated with the reference clip and with the reference clip algorithm;

receiving one or more current-digital-network packets having the transport protocol;

extracting one or more current payloads from the one or more current-digital-network packets as a current clip;

selecting a current clip algorithm;

generating one or more current key values associated with the current clip and with the current clip algorithm; and comparing the one or more current key values with the one or more reference key values to determine an occurrence of a match between the current clip and the reference clip, and wherein the reference clip algorithm is the same as the current clip algorithm, the reference clip algorithm to select the one or more reference key values by mapping a number of bits beginning at respect one or more byte offsets in the one or more reference real-time protocol payloads, and the current clip algorithm to select the one or more current key values by the same mapping of the same number of bits beginning at respective one or more byte offsets in the one or more current real-time protocol payloads.

2. The method of claim 1, wherein the predetermined clip includes an audio clip and the one or more current-digital-network packets include an audio signal.

3. The method of claim 2, wherein the transport protocol includes a media transport protocol.

4. The method of claim 2, wherein the transport protocol includes at least one CODEC format.

5. The method of claim 4, wherein the at least one CODEC format is a selected one of a G.711 format, a G.723 format, and a G.729 format, an AMR format, a global system for mobile communications (GSM) format, a G.726 format, a G.722 format, a G.728 format, and video CODEC formats MPEG2 and MPEG4.

6. The method of claim 1, wherein the predetermined clip includes a video clip and the one or more current-digital-network packets include a video signal.

7. The method of claim 1, wherein the comparing comprises:
comparing the one or more current key values with the one or more reference key values associated with the reference clip; and
comparing the one or more current key values with one or more other reference key values associated with a plurality of reference clips.

8. The method of claim 1, wherein the comparing comprises:
determining a number of matches between the one or more current key values and the one or more reference key values associated with the reference clip; and
deeming the current-digital-network packets to match the reference clip if the number of matches is greater than or equal to a predetermined threshold value.

9. The method of claim 1, wherein the reference clip algorithm, the current clip algorithm, the reference-digital-network packets, and the current-digital-network packets are associated with a CODEC format.

10. The method of claim 1, further including:
recording at least one of the reference clip and the one or more reference key values associated with the reference clip; and
retrieving at least one of the recorded reference clip and at least one of the recorded one or more reference key values.

11. The method of claim 1, further including:
identifying a CODEC format associated with the one or more current-digital-network packets; and
selecting the current clip algorithm in accordance with the identified CODEC format.

12. The method of claim 1, further including:
selecting the reference clip algorithm and the current clip algorithm from among a plurality of clip algorithms in accordance with a CODEC format, the reference-digital-network packets and the current-digital-network packets associated with the CODEC format.

13. The method of claim 12, wherein the CODEC format is selected from among a G.711 format, a G.723 format, and a G.729 format, an AMR format, a global system for mobile communications (GSM) format, a G.726 format, a G.722 format, a G.728 format, and video CODEC formats MPEG2 and MPEG4.

14. A computer program readable storage medium encoded with computer executable instructions executed by a computer to test signal characteristics of a communication formed from digital-network packets having a transport protocol, including instructions for:
receiving one or more reference-digital-network packets corresponding to a predetermined clip, the one or more reference-digital-network packets having the transport protocol;
extracting one or more reference-real-time protocol payloads from the one or more reference-digital-network packets as a reference clip;
selecting a reference clip algorithm;
generating one or more reference key values associated with the reference clip and with the reference clip algorithm;
receiving one or more current-digital-network packets having the transport protocol;
extracting one or more current payloads from the one or more current-digital-network packets as a current clip;
selecting a current clip algorithm;
generating one or more current key values associated with the one or more current payloads and with the current clip algorithm; and
comparing the one or more current key values with the one or more reference key values to determine an occurrence of a match between the current clip and the reference clip, and wherein the reference clip algorithm is the same as the current clip algorithm, the reference clip algorithm to select the one or more reference key values by mapping a number of bits beginning at respective one or more byte offsets in the one or more reference in real-time protocol payloads, and the current clip algorithm to select the one or more current key values by the same mapping of the same number of bits beginning at respective one or more byte offsets in the one or more current real-time protocol payloads.

15. The computer program medium of claim 14, wherein the predetermined clip includes an audio clip and the one or more current-digital-network packets include an audio signal.

16. The computer program medium of claim 15, wherein the transport protocol includes a media transport protocol.

17. The computer program medium of claim 15, wherein the transport protocol includes at least one CODEC format.

18. The computer program medium of claim 17, wherein the at least one CODEC format is a selected one of a G.711 format, a G.723 format, and a G.729 format, an AMR format, a global system for mobile communications (GSM) format, a G.726 format, a G.722 format, a G.728 format, and video CODEC formats MPEG2 and MPEG4.

19. The computer program medium of claim 14, wherein the predetermined clip includes a video clip video and the one or more current-digital-network packets include a video signal.

20. The computer program medium of claim 14, wherein the comparing includes instructions for:
comparing the one or more current key values with the one or more reference key values associated with the reference clip; and
comparing the one or more current key values with one or more other reference key values associated with a plurality of reference clips.

21. The computer program medium of claim 14, wherein the comparing includes instructions for
determining a number of matches between the one or more current key values and the one or more reference key values associated with the reference clip; and
deeming the current-digital-network packets to match the reference clip if the number of matches is greater than or equal to a predetermined threshold value.

22. The computer program medium of claim 14, wherein the reference clip algorithm, the current clip algorithm, the reference-digital-network packets, and the current-digital-network packets are associated with a CODEC format.

23. The computer program medium of claim 14, further including instructions for:
  recording at least one of the reference clip and the one or more reference key values associated with the at least one reference clip; and
  retrieving at least one of the recorded reference clip and at least one of the recorded reference key values.

24. The computer program medium of claim 14, further including instructions for:
  identifying a CODEC format associated with the one or more current-digital-network packets; and
  selecting the current clip algorithm in accordance with the identified CODEC format.

25. The computer program medium of claim 14, further including instructions for:
  selecting the reference clip algorithm and the current clip algorithm from among a plurality of clip algorithms in accordance with a CODEC format, the reference-digital-network packets and the current-digital-network packets associated with the CODEC format.

26. The computer program medium of claim 14, wherein the CODEC format is selected from among a G.711 format, a G.723 format, and a G.729 format.

27. A processor to test signal characteristics of a communication formed from digital-network packets having a transport protocol, comprising:
  a digital-network-packet receiver to receive one or more reference-digital-network packets corresponding to a predetermined clip and to receive one or more current-digital-network packets;
  a payload extractor coupled to the digital-network packet receiver to extract, as a reference clip, one or more reference payloads from the one or more reference-digital-network packets and to extract, as a current clip, one or more current payloads from the one or more current-digital-network packets;
  a key generator having a reference clip algorithm to form one or more reference key values associated with the one or more reference payloads and a current algorithm to form one or more current key values associated with the one or more current payloads;
  a reference-key-and-reference-clip database coupled to the payload extractor to store at least one of the reference clip and the one or more reference key values; and a comparison processor coupled to the key generator and to the reference-key-and-reference-clip database, the comparison processor to compare the one or more reference key values with the one or more current key values to determine an occurrence of a match between the current clip and the reference clip, and wherein the reference clip algorithm is the same as the current clip algorithm, the reference clip algorithm to select the one or more reference key values by mapping a number of bits beginning at respective one or more byte offsets in the one or more reference real-time protocol payloads, and the current clip algorithm to select the one or more current key values by the same mapping of the same number of bits beginning at respective one or more byte offsets in one or more current real-time protocol payloads.

28. The processor of claim 27, wherein the predetermined clip includes an audio clip and the current-digital-network packets include an audio signal.

29. The processor of claim 27, wherein the transport protocol includes a media transport protocol.

30. The processor of claim 27, wherein the transport protocol includes at least one CODEC format.

31. The processor of claim 30, wherein the at least one CODEC format is a selected one of a G.711 format, a G.723 format, and a G.729 format, an AMR format, a global system for mobile communications (GSM) format, a G.726 format, a G.722 format, a G.728 format, and video CODEC formats MPEG2 and MPEG4.

32. The processor of claim 27, wherein the predetermined clip includes a video clip and the current-digital-network packets include a video signal.

33. The processor of claim 27, wherein the comparison processor is adapted to compare the one or more current key values with the one or more reference key values associated with a plurality of reference clips.

34. The processor of claim 27, wherein the comparison processor is adapted to determine a number of matches between the one or more current key values and the one or more reference key values associated with the reference clip, and to deem the one or more current-digital-network packets to match the reference clip if the number of matches is greater than or equal to a predetermined threshold value.

35. The processor of claim 27, wherein the reference clip algorithm, the current clip algorithm, the reference-digital-network packets, and the current-digital-network packets are associated with a CODEC format.

36. The processor of claim 27, further including at least one silence algorithm coupled to the payload extractor to detect if the current-digital-network packets contain silence.

* * * * *